US011731563B2

(12) United States Patent
Dickinson et al.

(10) Patent No.: US 11,731,563 B2
(45) Date of Patent: Aug. 22, 2023

(54) MAGNETIC LATCH AND VEHICLE CONTAINER AND SYSTEM

(71) Applicant: Termax LLC, Lake Zurich, IL (US)

(72) Inventors: Daniel James Dickinson, Lincolnshire, IL (US); David Friesorger, McHenry, IL (US); Shawn Willis, White Lake, MI (US)

(73) Assignee: TERMAX COMPANY, Lake Zurich, IL (US)

( * ) Notice: Subject to any disclaimer, the term of this patent is extended or adjusted under 35 U.S.C. 154(b) by 0 days.

(21) Appl. No.: 17/322,917

(22) Filed: May 18, 2021

(65) Prior Publication Data

US 2021/0340794 A1 Nov. 4, 2021

Related U.S. Application Data

(63) Continuation-in-part of application No. 16/571,185, filed on Sep. 15, 2019, now Pat. No. 10,995,783, and a continuation-in-part of application No. 12/464,867, filed on May 13, 2009, now Pat. No. 8,615,852.

(60) Provisional application No. 63/028,564, filed on May 22, 2020.

(51) Int. Cl.
*B60R 7/04* (2006.01)
*E05B 47/00* (2006.01)
*E05B 83/32* (2014.01)
*E05B 77/40* (2014.01)
*E05B 83/30* (2014.01)

(52) U.S. Cl.
CPC ............ *B60R 7/04* (2013.01); *E05B 47/0038* (2013.01); *E05B 77/40* (2013.01); *E05B 83/30* (2013.01); *E05B 83/32* (2013.01)

(58) Field of Classification Search
CPC ...... E05B 83/32; E05B 83/30; E05B 47/0038; E05B 77/40; E05B 77/36; E05C 19/16
USPC ................................................. 296/24.34, 37.8
See application file for complete search history.

(56) References Cited

U.S. PATENT DOCUMENTS

| | | | | | |
|---|---|---|---|---|---|
| 3,418,018 | A | * | 12/1968 | Marburger | E05C 19/16 29/404 |
| 2005/0023841 | A1 | * | 2/2005 | Chen | G06F 1/1679 292/251.5 |
| 2014/0001322 | A1 | * | 1/2014 | Joyce | B62D 27/06 248/206.5 |

FOREIGN PATENT DOCUMENTS

| | | | |
|---|---|---|---|
| JP | H0238351 U | * | 3/1990 |
| JP | H0632177 A | * | 2/1994 |

OTHER PUBLICATIONS

Translation of JP 2-38351 (Year: 1990).*

* cited by examiner

*Primary Examiner* — Dennis H Pedder

(57) ABSTRACT

A magnetic latch for a lid and the bin of a container in a vehicle comprises at least one overmolded magnet detachably connected to a lid. A metal portion is magnetically attracted with the overmolded magnet. At least one overmolded magnet is connected to a bin having a magnetic attraction with the lid overmolded magnet to magnetically open and close the lid and the bin of the container. The overmold on the magnet encloses the magnet with vibration dampening material such as rubber. The metal portion may be a second at least one overmolded magnet second. The container may be a center console, glove box, ash tray, trunk, sun roof shade, cover. Spears, clips, prongs other suitable (Continued)

fasteners may be formed on one side of the overmold to allow insertion and attachment to a corresponding hole on the lid.

24 Claims, 25 Drawing Sheets

1856, 1866

MAGNETIC LATCH AND VEHICLE CONTAINER AND SYSTEM

RELATED APPLICATIONS

This is a continuation in part application claiming priority from an application entitled "Magnetic Fastener Clip" having an application Ser. No. 12/464,867, a U.S. Pat. No. 8,615,852, and having a filing date of May 13, 200. This is a continuation in part application claiming priority from an application entitled "Fastener Clip Assembly with a Dome and Limiters" having an application Ser. No. 16/571,185, a U.S. Pat. No. 10,995,783 and having a filing date of Sep. 15, 2019, the entire disclosure of which is incorporated herein by reference.

FIELD OF THE INVENTION

The invention relates generally to devices for latching objects, and more particularly to a magnetic latch and/or damper for securely closing a lid to a container in a vehicle and for dampening and absorbing vibrations in a container, a vehicle chassis, a storage compartment, cover, shade, or any suitable lid or door.

BACKGROUND OF THE INVENTION

A number of mechanical devices are currently available for latching lids to containers such as center consoles in a vehicle. Conventional mechanical latches are complex, require plastic or steel springs, and engage result in unpleasant vibrations and noises. Also, over time plastic degrades and as such plastic spring latches lose their elasticity resulting in BSR, buzz, squeak and rattles. Similarly, plastic latch and spring combinations degrade also resulting in unwanted BSR.

Conventional mechanical latches require two actions, namely, a squeeze and a lift that require multiple actions and manipulations. An example of such mechanical latches is described in U.S. Pat. Nos. 9,738,227, 9,963,923, 7,240,941, 9,919,654, and 10,352,071 all incorporated by reference.

As used herein, a body panel refers to, for example, any interior or exterior structure attached to a vehicle, such as a plastic or metal interior trim piece or any interior trimpiece. The body panel may be any suitable exterior body panel, such as a fender, bumper, quarter panel or door panel. The chassis of the vehicle may include any substrate, roof, plate, body panel, structural framework, chassis component or subcomponent, support component, wall or any suitable object or combination.

Conventional mechanical latches in automotive applications have exposed magnets that exposes the magnets to other surfaces like plastic and metal resulting in vibration, chattering, rattling, buzzing and (BSR).

Problems of existing disadvantages of conventional mechanical latches include the reliance on a plastic latch to remain in tension to avoid rattling. However the plastic on plastic contact is prone to rubbing and rattling. Conventional latches rely on the plastic latch to act as a spring as well as a hook to engage a pin or striker plate or rim. Another disadvantage is that over time, the springing or elasticity of the plastic latch degrades so the latch is under less or no tension resulting in rattling, and BSR. Also, the latch and corresponding rim are both made of plastic and thus when the latch and rim strike each other the result is plastic to plastic contact or collision. The plastic components including the latch, rim, bin and lid vibrate due to the absorption of energy from closing, opening or road vibrations. These vibrations created by plastic components resulting in a closing, opening or rattling sound that produces plastic snap or tinny sounds associated with sounds that reflect low quality, inexpensive feel if not cheap.

As a result, sagging, wear, squeaks, rattles, buzzing, corrosion and loss of elasticity and loss of sealing may result, especially after years of vehicle operation and exposure to vibration and other environmental conditions. As such, these mechanical latches do not provide a sufficient quality feel.

Once installed, during use of the automobile, the container or compartment is sometimes contacted or pushed by passengers. The latch is typically required to secure the lid on the container under a variety of environmental conditions, such as in the presence of vibration at various levels of amplitude and frequency. Further, the latch device should prevent or minimize the amount of buzzing, rattling or any other type of noise that may cause attention to the occupants of the vehicle or otherwise weaken the attachment. Further yet, another requirement of the latch is that the latch accommodates various levels of plastic and sheet metal curvature, thicknesses, and production tolerances, such as various dimensions amongst, for example, the lid as well as the container. Conventional latches typically do not adequately close to a range of plastic and sheet metal thicknesses and do not minimize or eliminate buzzing and rattling and do not sufficiently accommodate variations in production tolerances. As a result, these latches do not properly close the lid to the container, vibrate or worse break or otherwise fail under these conditions. If the latch is broken, the lid will vibrate and open over bumps in the road again presenting noise, BSR and an aesthetically undesirable appearance. Further, replacement of an installed, broken latch can be difficult.

DETAILED DESCRIPTION OF THE PREFERRED EMBODIMENTS

Figure 1:
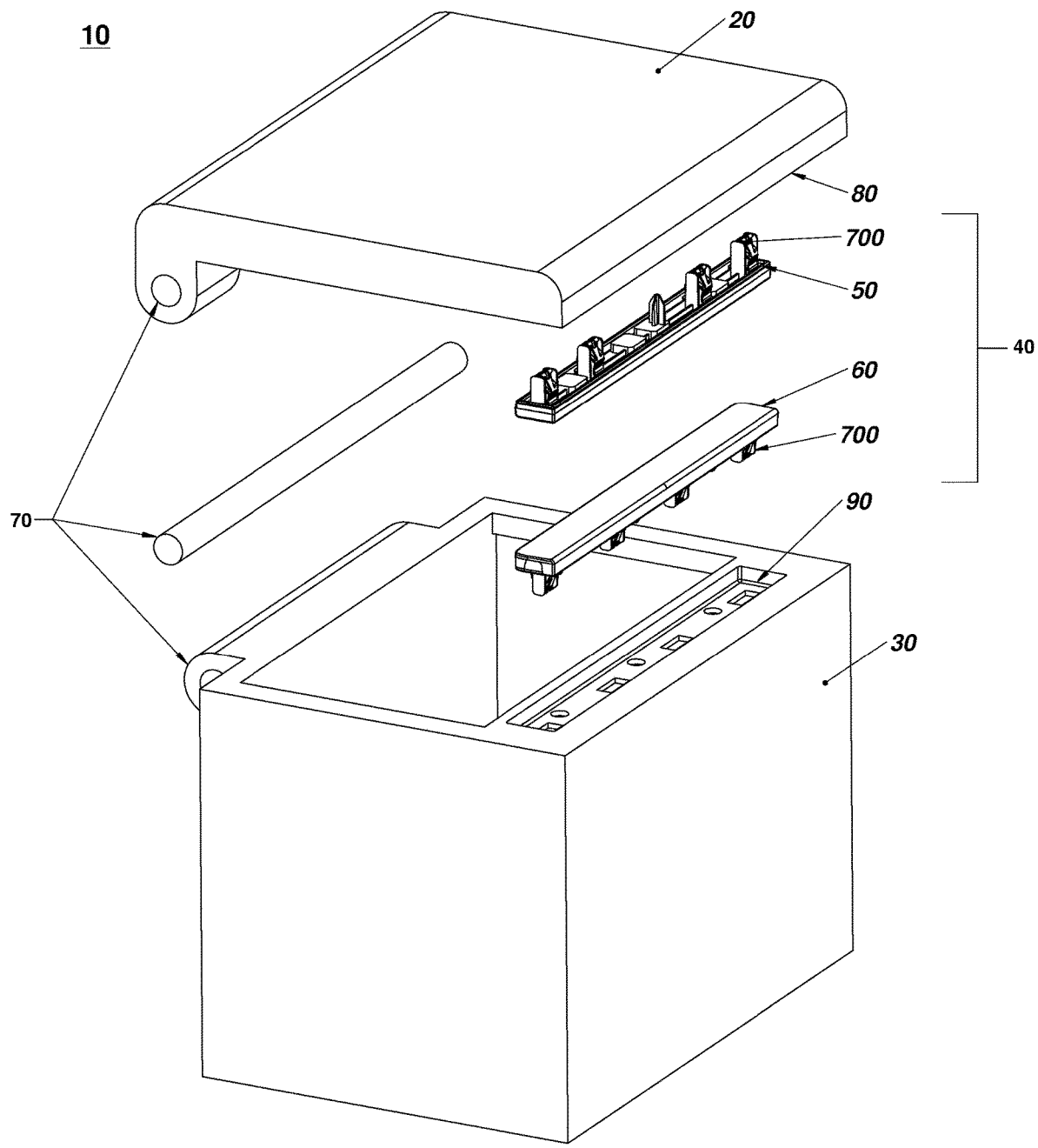
FIGS. 1-7 are various views of a container or console and magnetic latch assembly.

A magnetic latch for a lid and a bin of a container in a vehicle comprises at least one overmolded magnet detachably connected to a lid. A metal portion is magnetically attracted with the overmolded magnet. At least one overmolded magnet is connected to a bin having a magnetic attraction with the lid overmolded magnet to magnetically open and close the lid and the bin of the container. The overmold on the magnet encloses the magnet with vibration dampening material such as rubber. The metal portion may be a second at least one overmolded magnet second. The container may be a center console, glove box, ash tray, trunk, sun roof shade, cover. Spears, clips, prongs other suitable fasteners may be formed on one side of the overmold to allow insertion and attachment to a corresponding hole on the lid.

Among other advantages, the vibration dampening material such as a rubber bumper has a multiple purpose: latching the bin closed, as well as a BSR counter measure, antisqueak, absorbing vibration, dampening mechanical vibrations, prevents rattle. The overmolded magnet is easy to replace by removing the overmolded magnet and replacing rather than replacing an entire conventional mechanical latch. Another advantage is the there is nothing mechanical to wear out since the latch closes and stays closed with magnetic force.

The magnetic latch relatively easily facilitates attachment of a lid or body panel with the container, such as the center console, glove box, vehicle door compartment, sun roof cover, sun-roof section, instrument panel structure.

Even if the magnets degrade slightly, the design of the magnet geometry, rubber overmold and the design distance between the magnets permit self-adjusting such that the rubber and magnet degrade together and they compensate for their respective degradations. For example, when the magnets produce a lower magnetic field over time due to natural degrading or due to use or environmental conditions (heat, vibration, pressure, sun exposure, impact, magnetic and electric fields, air, water, humidity etc.), the rubber overmold could be designed to be thinner to compensate for the reduced magnetic field. The rover overmold material may be designed to reduce in thickness and thus reduce the distance between the bin and lid magnets in response to the same above conditions by selecting a compound, polymer, rubber with the desired above combination of characteristics. A thinner overmold layer between the bin and lid magnets reduces the distance between the magnets thus maintaining a substantially similar attracting force between the bin and lid magnets. Thus replacement of the magnets or overmold even over many years of use is unnecessary. Also, rattles, buzz, noise, harshness and vibrations are reduced or eliminated because the adaptive compensation of magnet degradation maintains a substantial attracting force.

Among other advantages, as the lid on the magnet assembly nears the magnetic overmold, the magnets will automatically align and attach with the magnetic bracket closing the bin to the lid very easily, and significantly easier than conventionally possible. The magnetic latch according to one embodiment provides a substantially zero gap between the lid and bin. Closing the lid onto the bin is very easy and requires no or a relatively low level of closing force compared to conventional containers that require a slam resulting in an unpleasant vibration and sound. Further the extraction force is a single motion pull rather than a squeeze and pull, and as a result provides many ergonomic advantages. For example, the relatively low level of closing force is particularly advantageous for operators who repetitively close the lid. The relatively low level of closing force required for blindly closing the lid into the compartment increases productivity and may result in quieter operation and even results in fewer injuries, including injuries related to repetitive stress syndrome. Further by selecting a single overmold magnet or reducing the number of overmold magnets for different containers, even with different curvatures and thicknesses, confusion during replacement is eliminated since the same type or a reduced number of overmolded magnets may be used for all or most containers or compartments. Thus, repair personnel need not worry about selecting the wrong fastener.

Further, the overmold magnet continuously adapts to changes in environmental conditions such as vehicle flexing, pushing by passengers, vibration and thermal expansion. For example, in addition or in combination with the adaptive features described above the magnetic latch may adapt to changes in thermal expansion, especially due to the differences in thermal expansion rates between dissimilar metals with respect to the vehicle chassis components and/or between plastic components such as the interior trim panels attached to the metal vehicle chassis. The overmolded magnet may also fasten to plastic and/or metal engagement structures. The magnetic latch may be made of anti-corrosive material such as plastic or treated metal to provide long reliable service life.

Yet another advantage is that the magnetic latch is relatively easy to manufacture using relatively inexpensive manufacturing processes and materials. The use of the magnetic latch decreases production costs, increases worker productivity and efficiency, improves reliability and quality and decreases overall vehicle assembly, warranty and maintenance costs. The magnetic latch securely attaches a lid such as a lid to a center console, or glove box, such that the magnetic latch improves reliability both in the short term and in the long term, while further improving vehicle safety and quality.

FIGS. 1-7 FIGS. 1-7 are various views of a container or console 10 comprising a lid 20 and bin 30, and magnetic latch assembly 40. The container 10 may be a center console, glove box, ash tray, trunk, optical glasses storage, fuse box, sun roof shade or cover or any suitable vehicle container.

FIG. 1 shows the magnetic latch 40 for a lid 20 and bin 30 comprises at least one lid latch 50 and at least one bin latch 60 and hinge 70. Although various embodiments of a plurality for pairs of lid latch 50 and bin latch 60 are shown, 1, 2, 3, 4, 5 lid latch 50 and bin latch 60 pairs may be used. Similarly, fewer or more magnets such as 2, 6, 10, 20 or more pairs may be used.

As will be described below, several embodiments of the at least one lid latch 50 and at least one bin latch 60 are described in detail. The different embodiments provide inventive solutions for connecting and arranging the magnets to satisfy a wide range of magnetic latch requirements.

Figure 2:
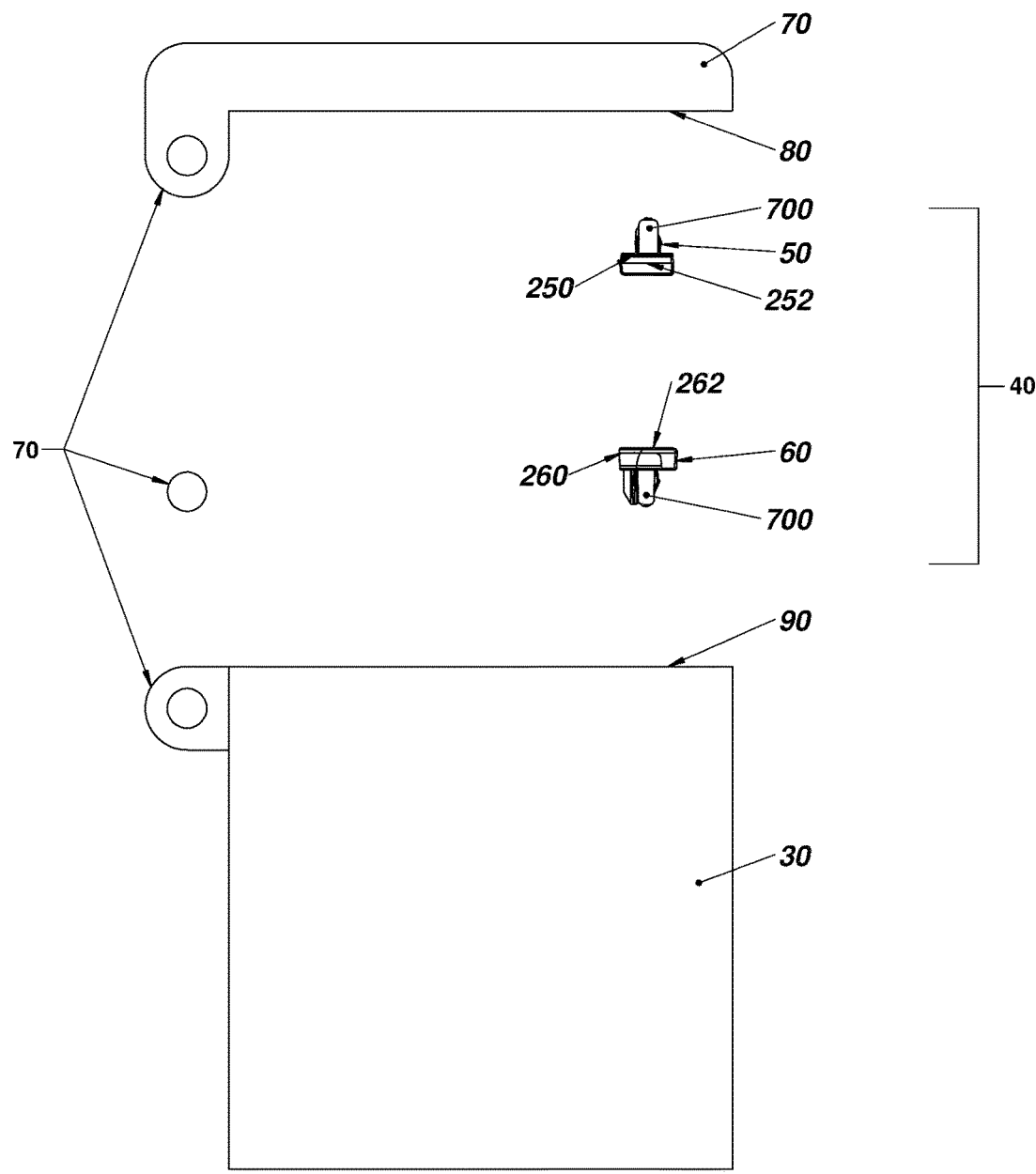

FIG. 2 is a side view of the container or console 10. The lid latch 50 further comprises a lid magnetic holder 250 and a magnetic material 252 attached to the lid magnetic holder 250, a lid fastener 700 attached to the lid magnetic holder 250 for attachment to the lid 20. The bin latch 60 further comprises a lid magnetic holder 260 and a magnetic material 262 attached to the lid magnetic holder 260, a lid fastener 700 attached to the lid magnetic holder 260 for attachment to the bin 300. The lid latch 50 and bin latch 60 comprise vibration dampening material to magnetically open and close the lid 20 and the bin 30 of the container 10. The magnetic material 252, 262 is at least one of: a magnet or metal having a magnetic attraction with the magnet. For example, the lid magnetic material 252 could be steel, a steel alloy, iron or any magnetic material while the bin magnetic material 262 could be a magnet, or vice versa. Alternatively, both the lid magnetic material 252 and the bin magnetic material 262 could both be magnets. According to one embodiment, the magnetic poles on the lid magnet 252 are aligned North to South and the magnetic poles on the bin magnet 262 are aligned South to North.

The lid magnet 252 is attached to the lid magnetic holder 250, and the bin magnet 262 is attached to the bin magnetic holder 260 via at least one of: glue, heat welding, ultrasonic welding, over-molding, mechanically fastened, metal clip, plastic clip, press fit and spears pressed into corresponding bin holes 80 and lid holes 90. According to one embodiment the vibration dampening material is rubber. Various embodiments of the lid magnetic holder 250 and the bin magnetic holder 260 such as an overmolded magnet and an overmold over a carrier and the magnet 252, 262b are described below.

Figure 3:
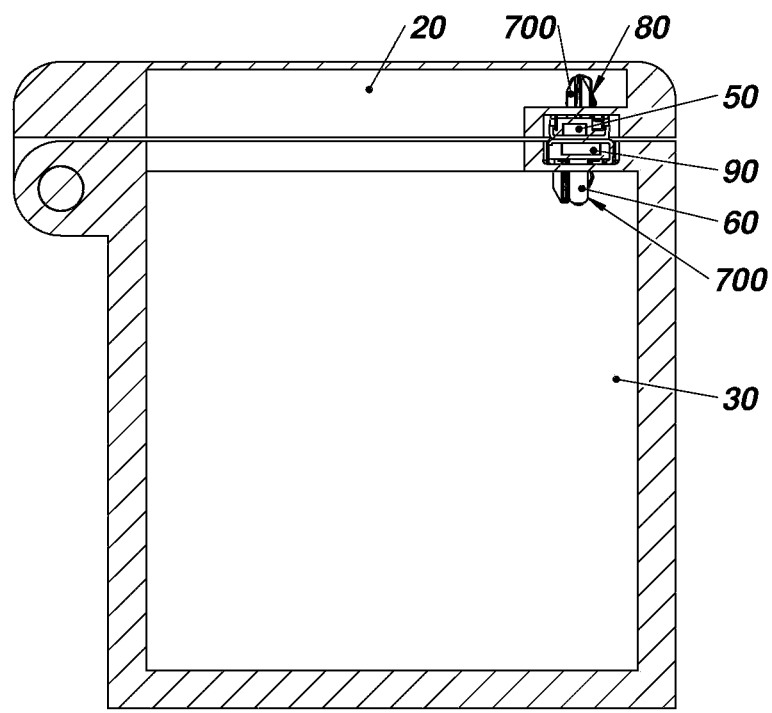

FIG. 3 shows the at least one lid latch 50 fastens to a corresponding lid slot 80. The at least one bin latch 60 fastens to a corresponding lid slot 90. The lid and bin fasteners 700 may attach to the inside portions of the lid 20 and bin 30 at an open end of the lid 20 and 30 opposite the hinge 70 side of the container 10.

Different embodiments of fasteners 700 will be described below to provide inventive solutions to a wide range of fastening requirements.

Figure 4:
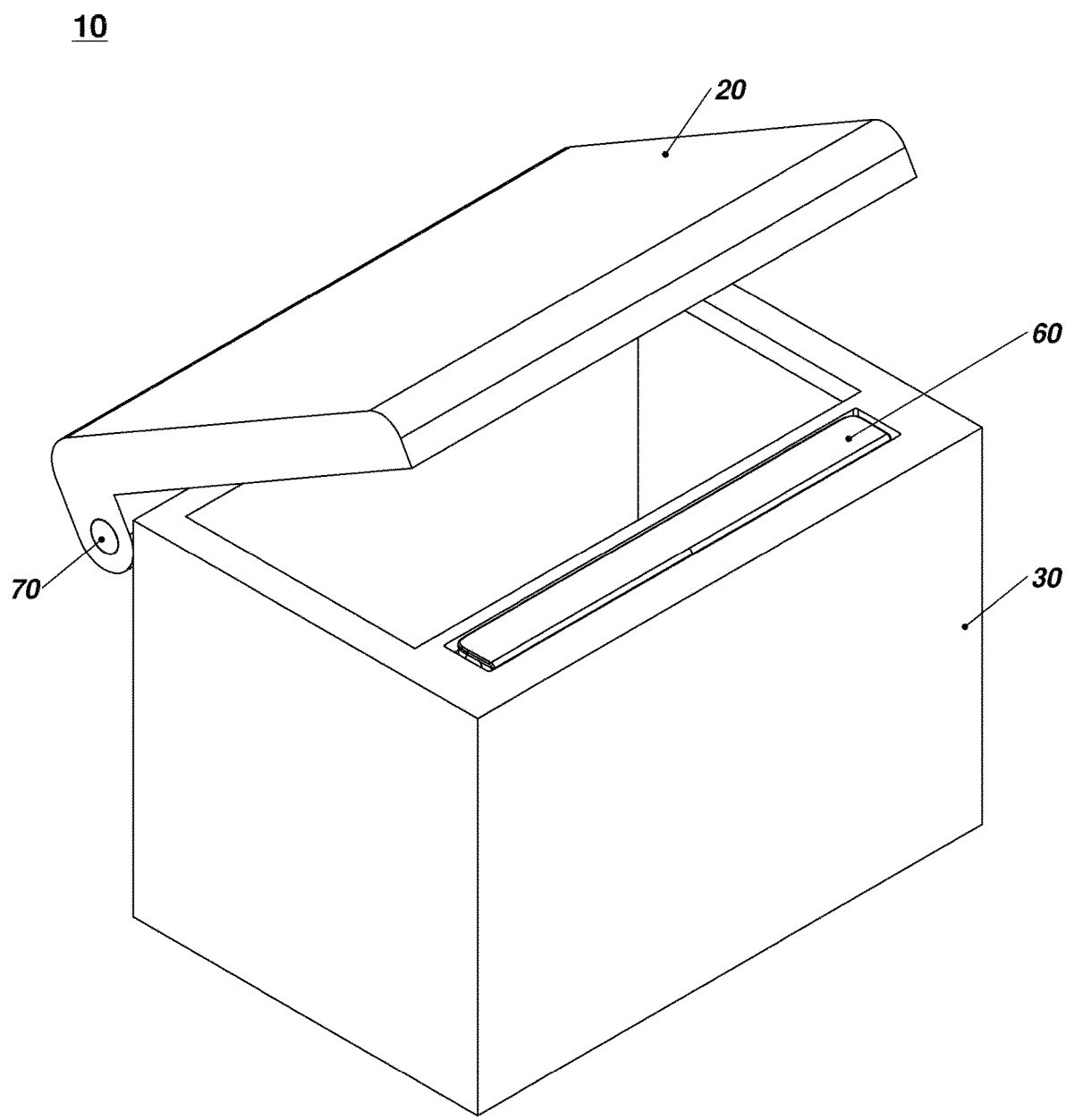
Figure 5:
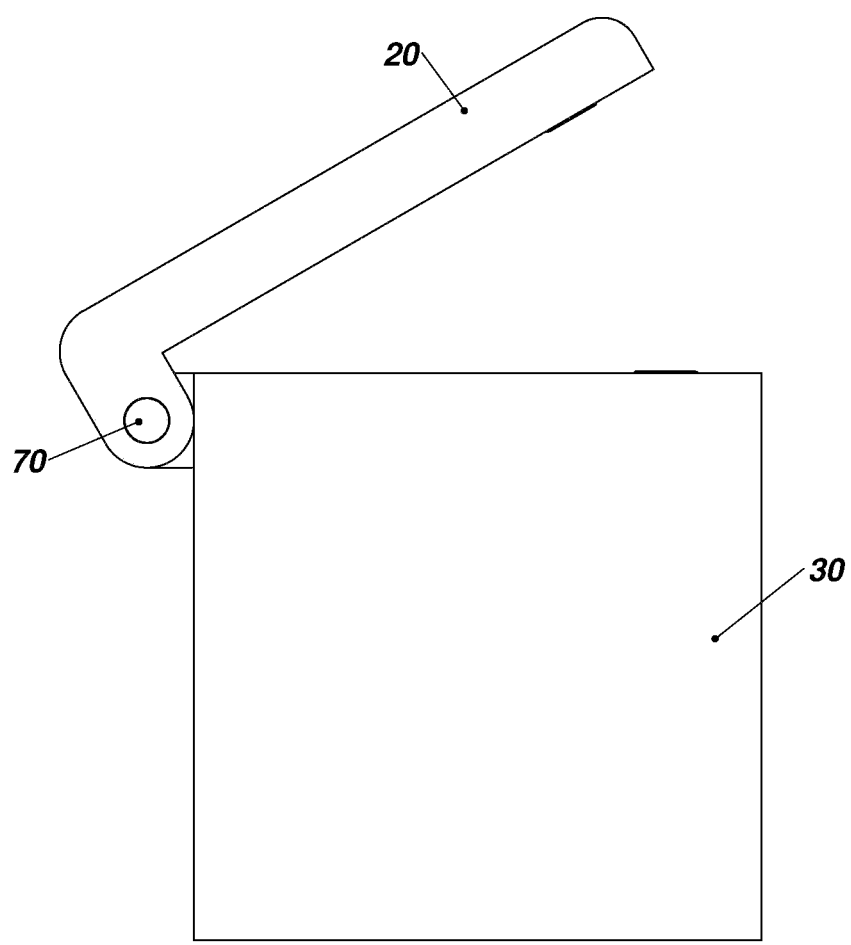

FIG. 4 is a view of the container 10 in an open position; FIG. 5 is a side view of the container 10 in an open position.

Figure 6:
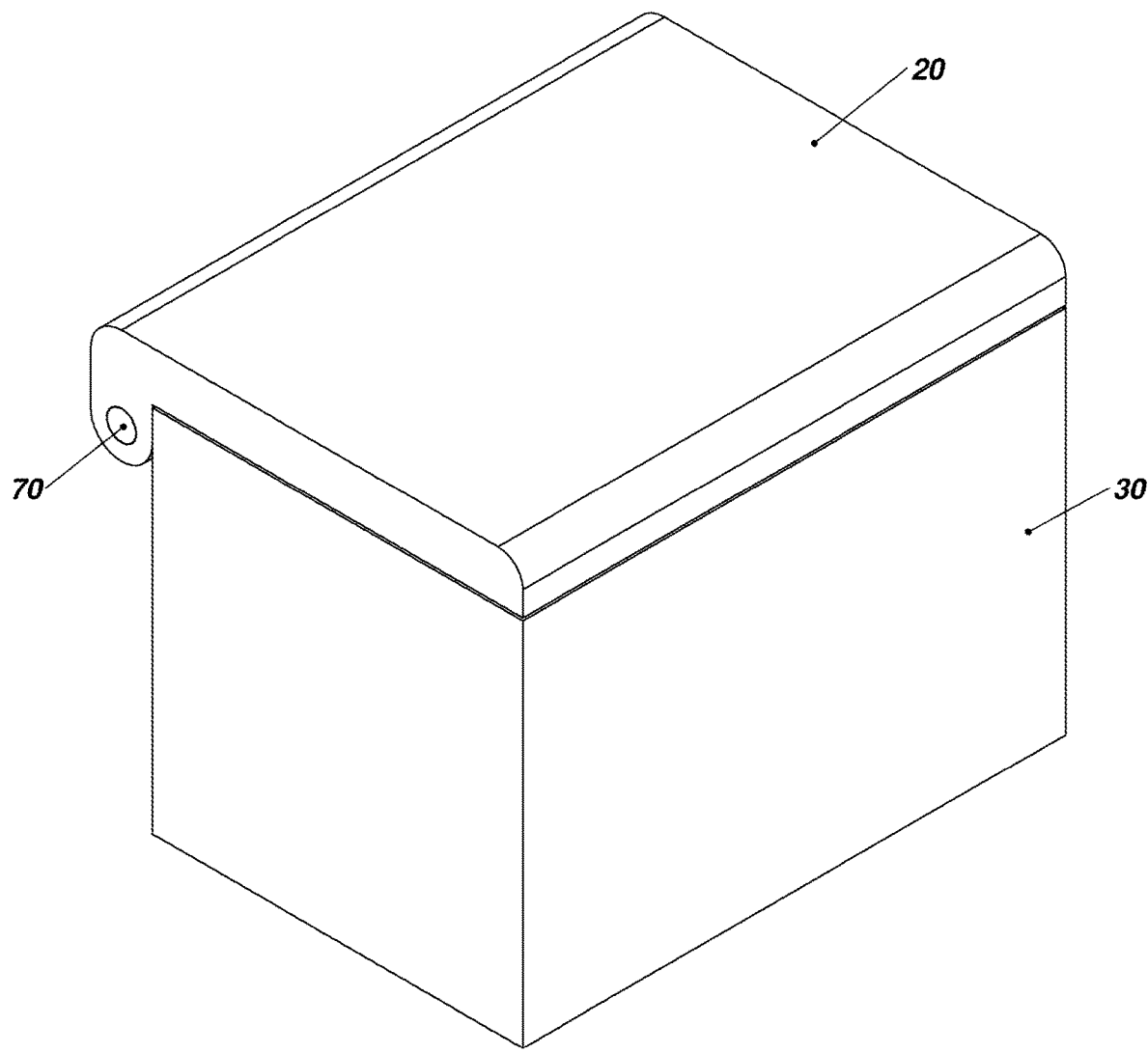

FIG. 6 is a perspective view of the container 10 in a closed position. As is also shown in FIG. 3, the magnetic latch 40 according to one embodiment provides a substantially zero gap between the lid 20 and bin 30. The zero gap may be formed by the lid latch 50 and bin latch 60 in contact. According to one embodiment a stand off, or wear material is positioned in between and provide contact with the lid latch 50 and bin latch 60 to compensate for aging as previously described.

Figure 7:
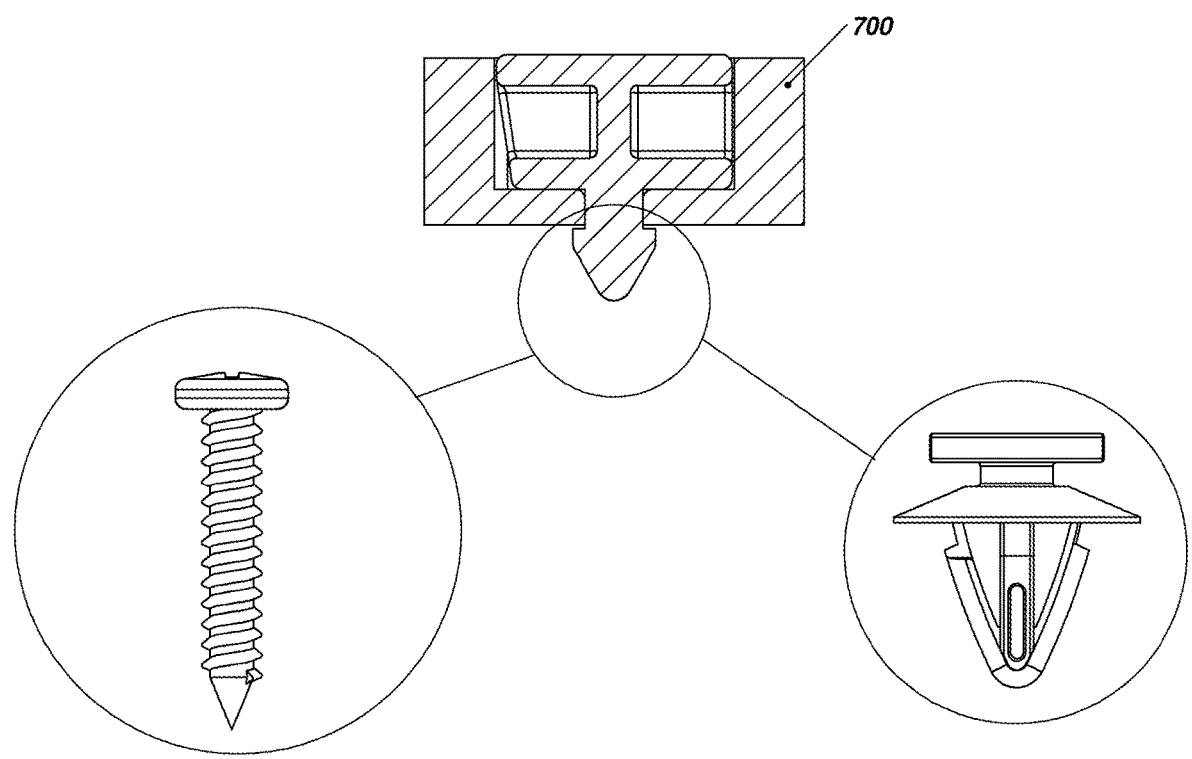

FIG. 7 shows three different embodiments for a fastener 700 fastening the overmolded magnets 50, 60 to corresponding lid slot 80 and lid slot 90. Other fastening embodiments will be described.

FIGS. 8-16 are various view of an overmolded latch assembly according to one embodiment.

Figure 10:
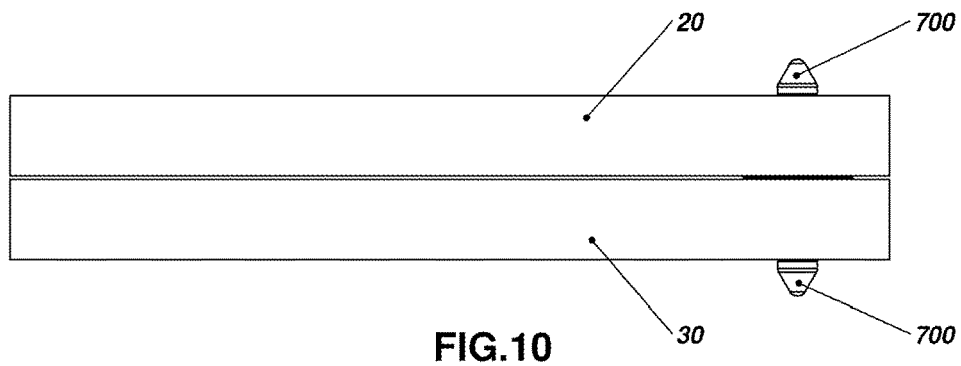
FIGS. 8-16 are various view of an overmolded latch assembly according to one embodiment.
Figure 9:
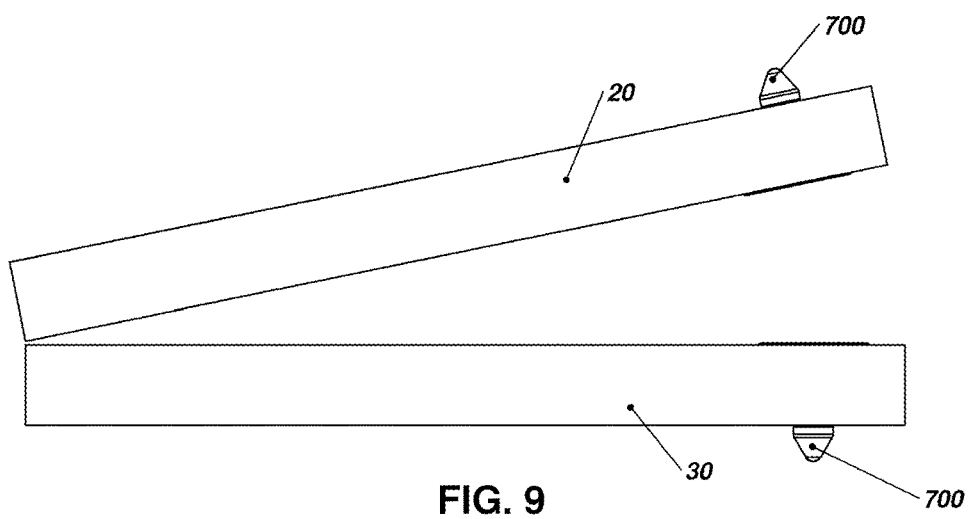
Figure 8:
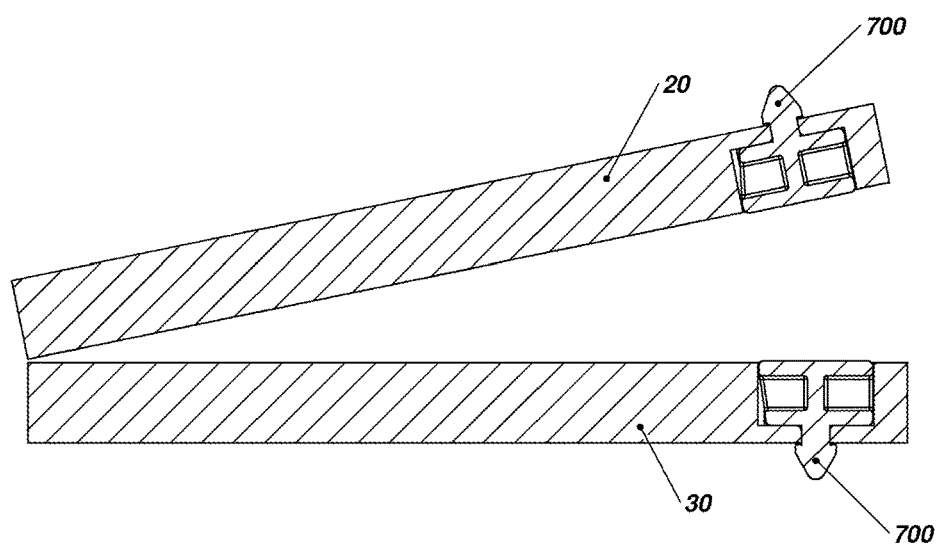

FIGS. 8, 9 and 10 are side views showing lid latch 50 and bin latch 60 in open and closed positions. Fastener 700 fastens the lid latch 50 and bin latch 60 to corresponding lid slot 80 and lid slot 90.

According to one embodiment, the lid latch 50 is an overmolded magnet 1150 and the bin latch 60 is an overmolded magnet 1160.

Figure 12:
Figure 11:
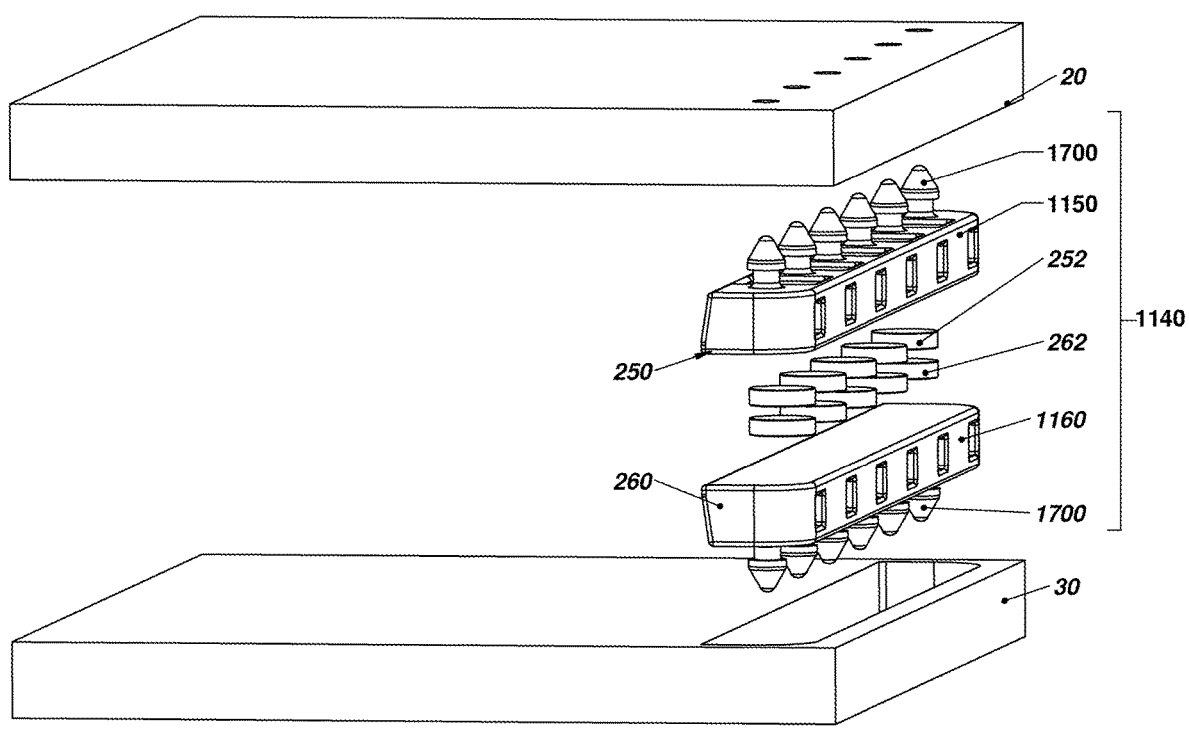
Figure 14:
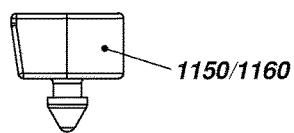
Figure 13:
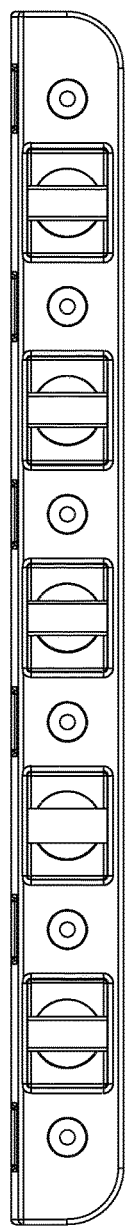
Figure 16:
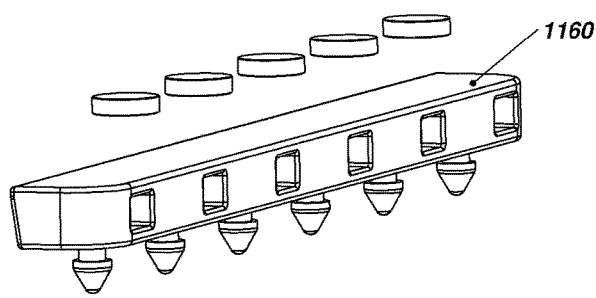
Figure 15:
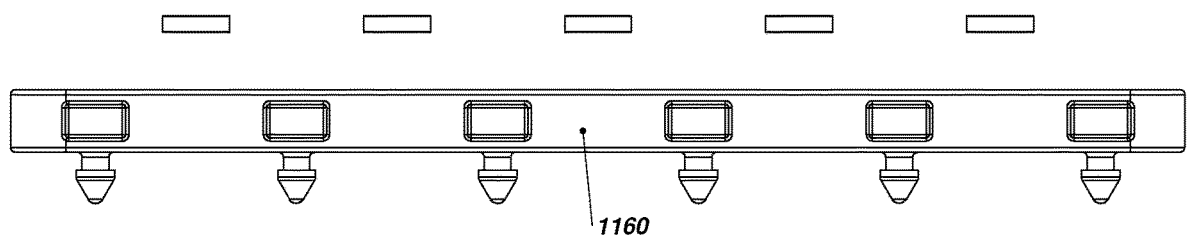
Figure 17:
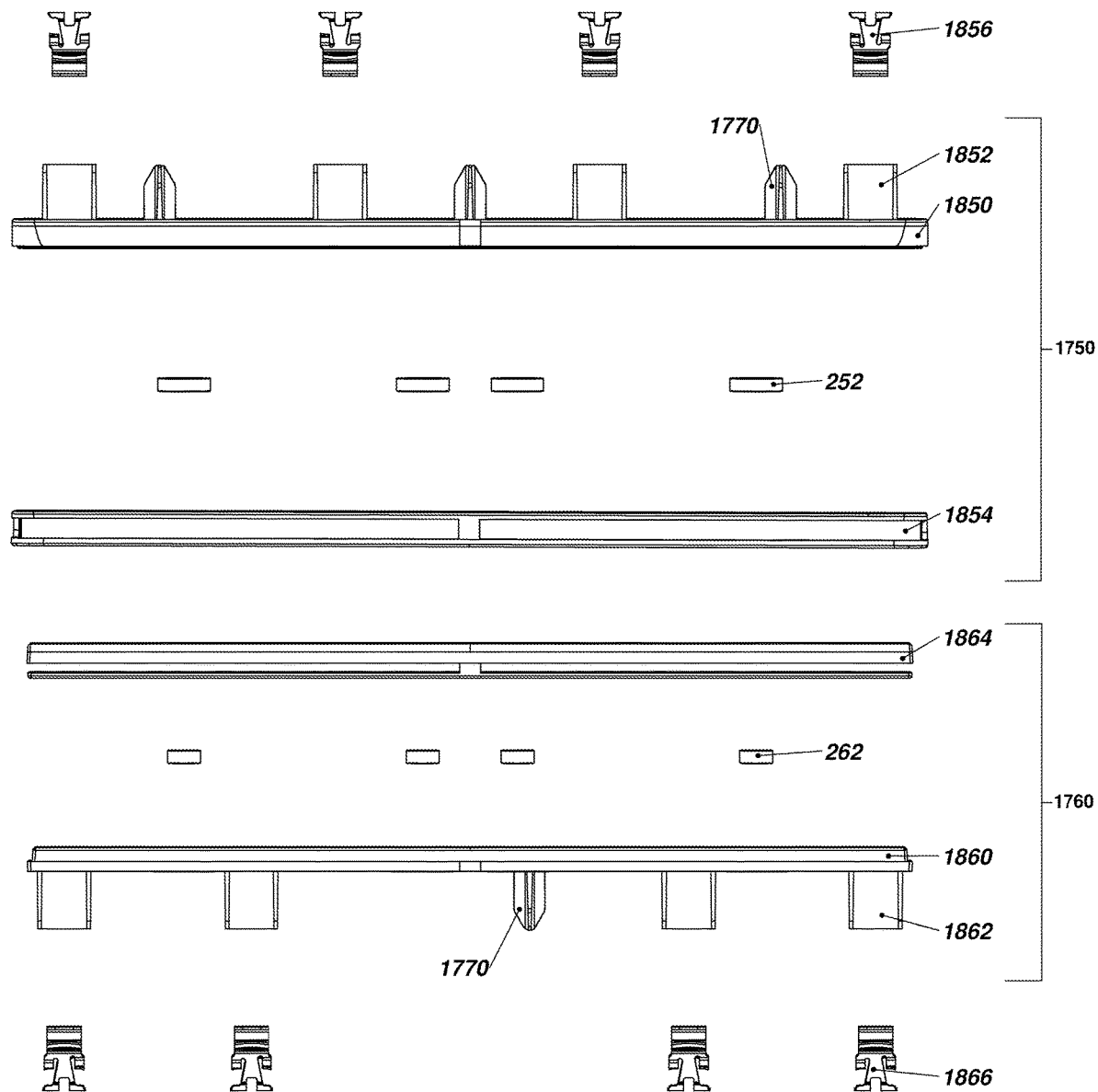
FIGS. 17-23 are various view of a clip latch assembly according to one embodiment.
Figure 18:
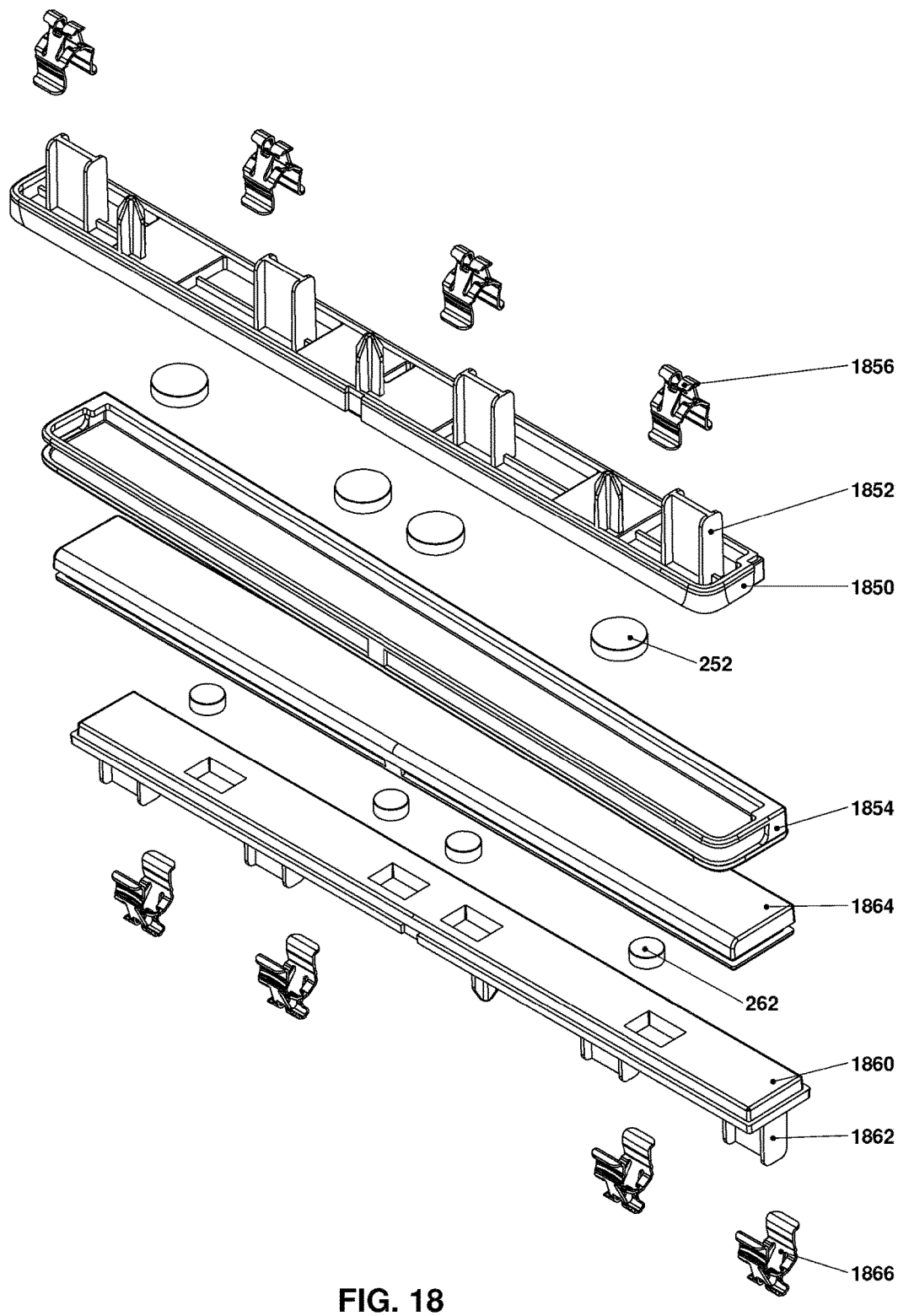
Figure 19:
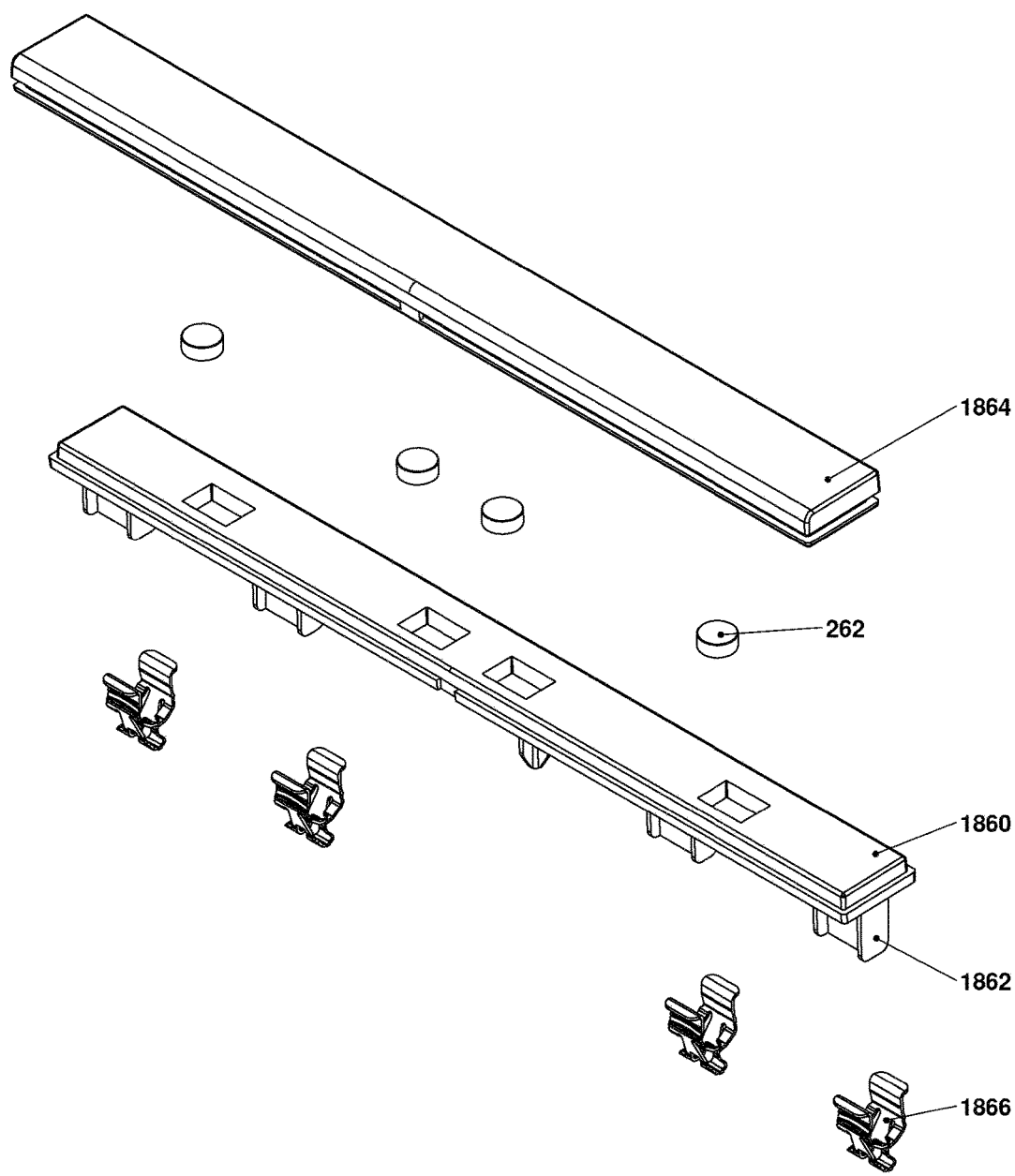
Figure 20:
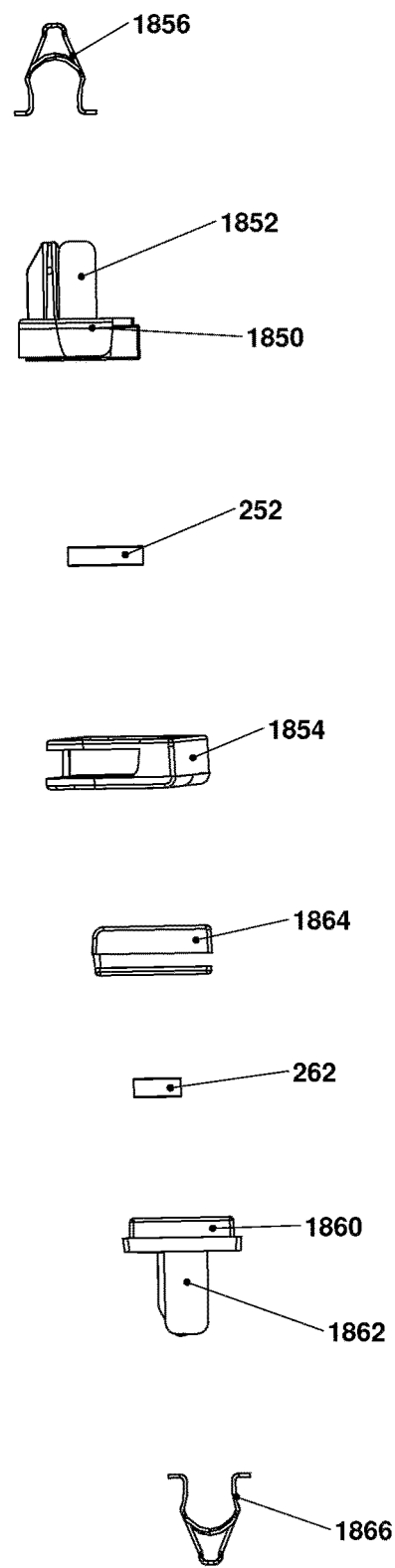
Figure 21:
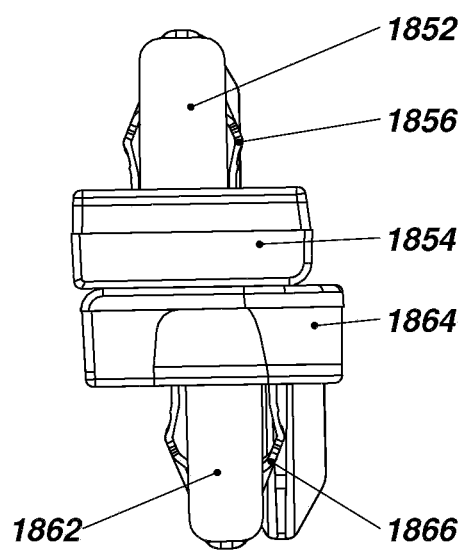
Figure 22:
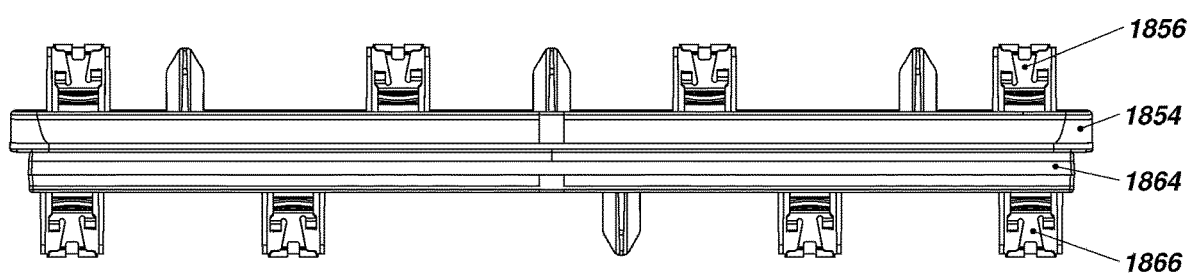

FIGS. 11-12 show the magnetic latch 1140 comprises at least one lid overmolded magnet 1150 and at least one bin overmolded magnet 1160. The magnets 252, 262 may be overmolded with rubber via injection molding. Fasteners 700 in this embodiment are spears formed by injection molding so that the spears 1700 are formed as part of the overmolded magnet 1150 and overmolded magnet 1160. Spears 1700 are formed on a side of the lid overmolded magnet 1150 opposite the lid magnet 252 to attach to a corresponding hole 80 on the lid 20. Spears 1700 are formed on a side of the bin overmolded magnet 1160 opposite the bin magnet 262 to attach to a corresponding hole on the bin 90.

Although various embodiments of a plurality for pairs of lid and bin overmolded magnets 1150, 1160 are shown, 1, 2, 3, 4, 5 overmolded magnets 1150, 1160 may be used. Fewer or more magnets such as 2, 6, 10, 20 or more pairs may be used.

As also shown in FIG. 3, the at least one lid overmolded magnet 1150 fastens to a corresponding lid slot 80. Similarly, the at least one lid overmolded magnet 1160 fastens to a corresponding lid slot 90.

According to one embodiment, the overmold 1150, 1160 comprises of at least one of: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS) or any suitable material. For example, the overmold 1150, 1160 is made any material that is flexible enough to support the magnets 252, 262 and to flex.

The durometer may be between 70 and 80, but may be less than 70 and greater than 80. For example, the durometer can be between 50 and 100.

FIGS. 17-23 are various view of a clip latch assembly 1740 according to one embodiment. The lid magnetic holder 250, 1750 further comprises a lid carrier 1850 comprising a lid rib 1852 and the lid carrier 1850 and the lid magnet 252 are overmolded 1854. The bin magnetic holder 260, 1760 further comprises a bin carrier 1860 having a bin rib 1862, and the bin carrier 1860 and the bin magnet 262 are overmolded 1864. The lid fastener 700 is a lid clip 1856 and the bin fastener 700 is a bin clip 1866. The lid clip 1856 is inserted and attached to the lid rib 1852. The bin clip 1866 is inserted and attached to the bin rib 1862. Thus, the entire lid magnetic holder 1750 may be clipped into the lid 20 by inserting lid clips 1856 into lid slot(s) 80. Similarly, the entire bin magnetic holder 1760 may be clipped into the bin 30 by inserting bin clips 1866 into lid slot(s) 90.

According to one embodiment, alignment prong(s) 1770 are inserted into corresponding slots 80, 90 to provide alignment during insertion of the lid magnetic holder 1750 into the lid 20 and of the lid clips 1856 into lid slot(s) 80. Similarly, alignment prong(s) 1770 are inserted into corresponding slots 80, 90 to provide alignment during insertion of the, the entire bin magnetic holder 1760 may be clipped into the bin 30 by inserting bin clips 1866 into lid slot(s) 90.

Figure 23:
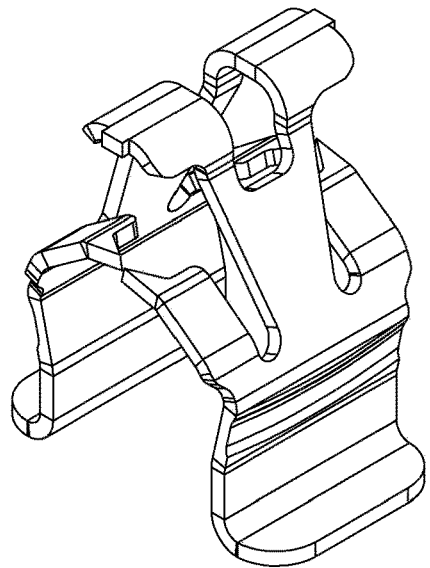
Figure 23:
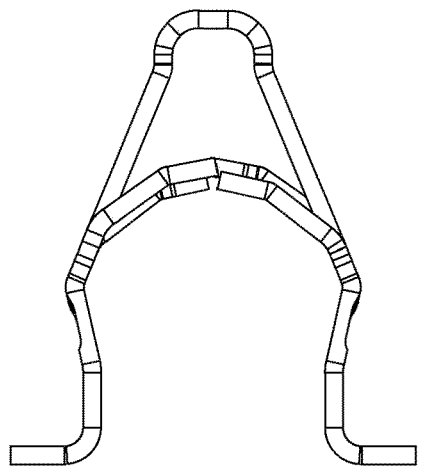
Figure 23:
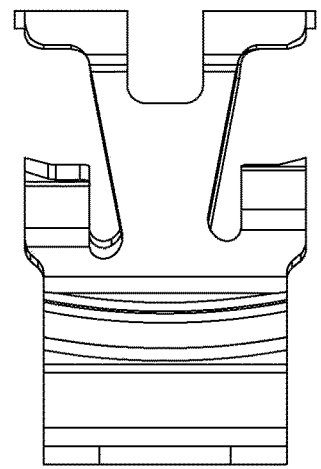
Figure 24:
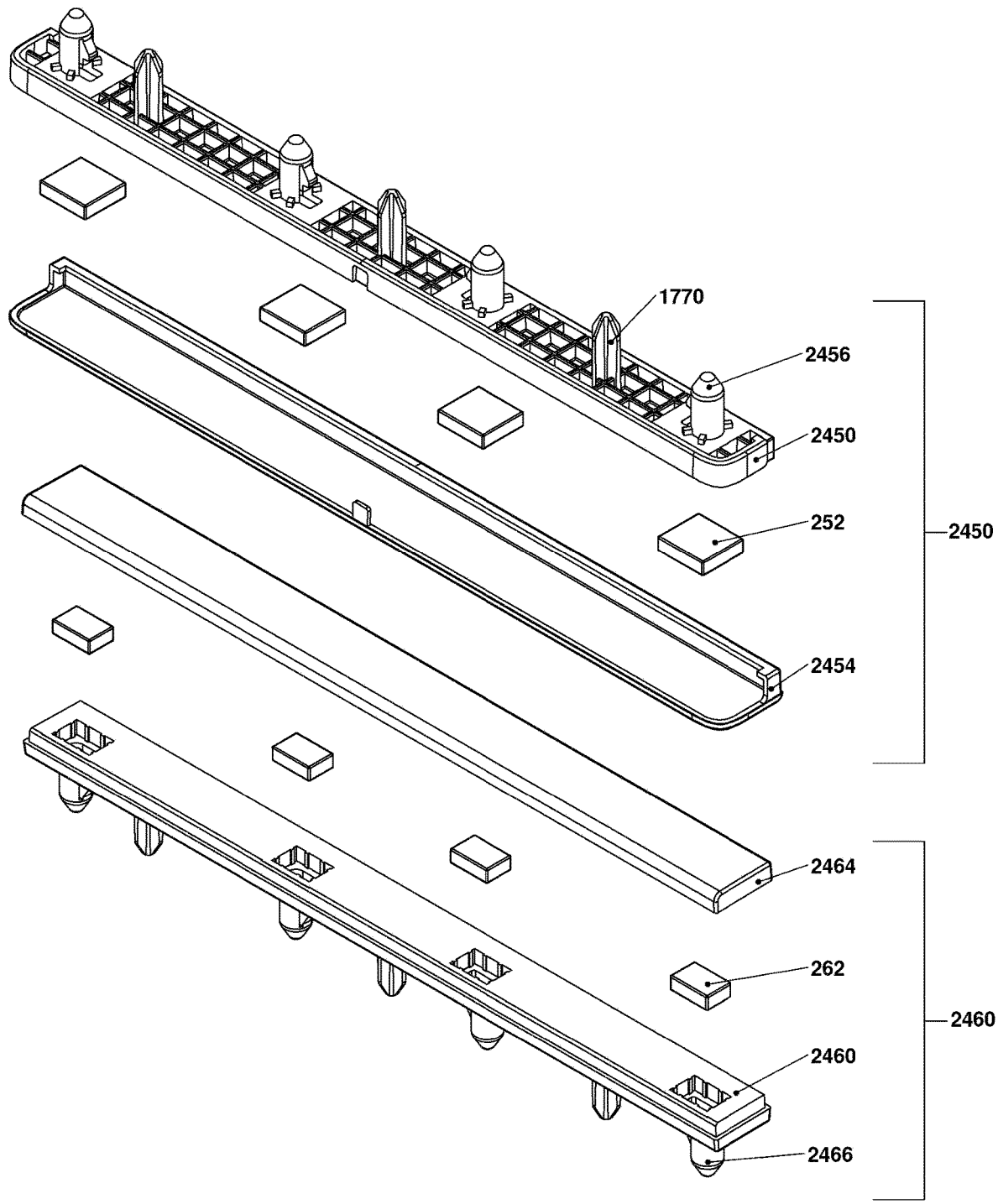
FIGS. 24-30 are various view of a dome or cap clip latch assembly according to one embodiment.
Figure 25:
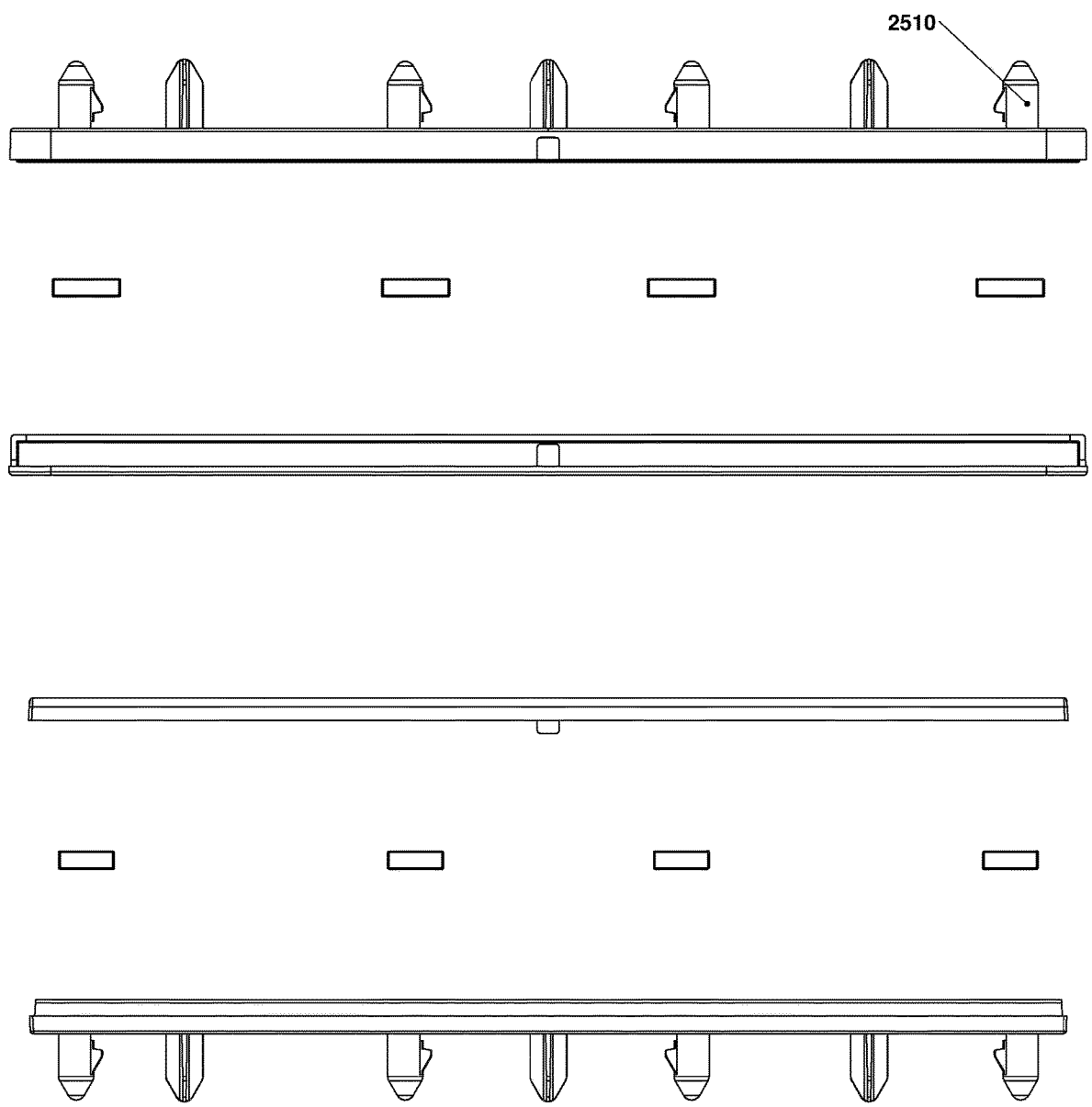
Figure 26:
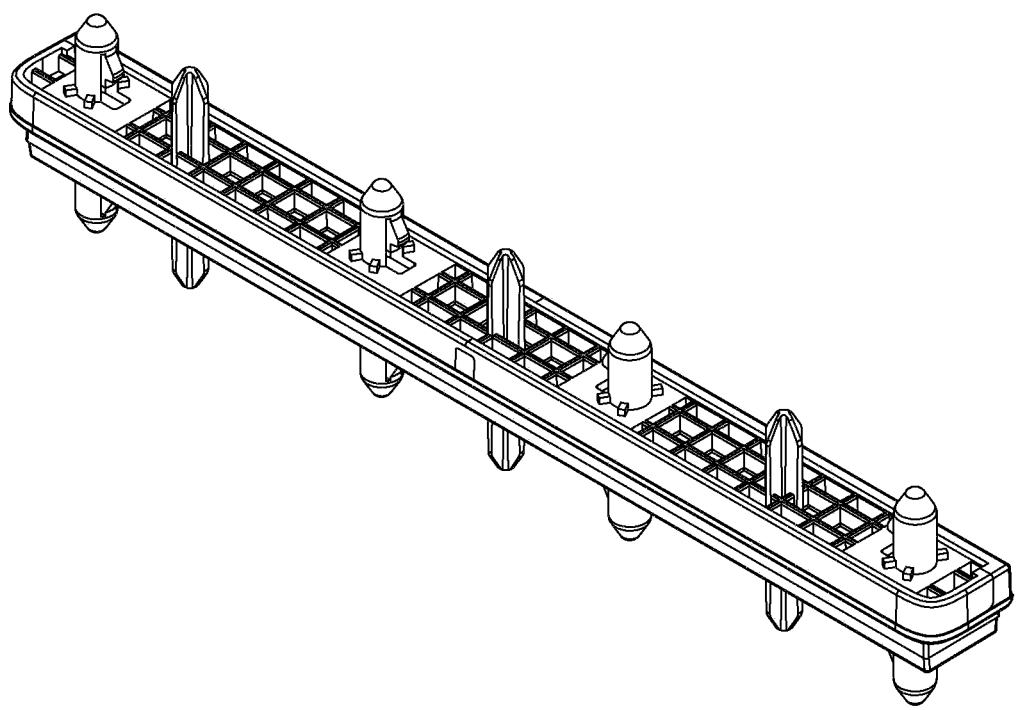
Figure 27:
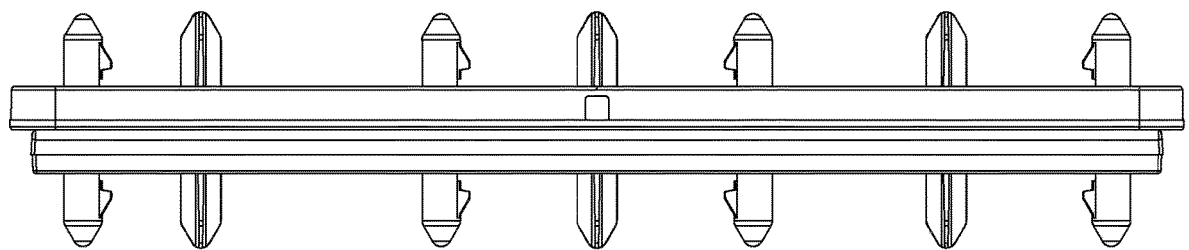
Figure 28:
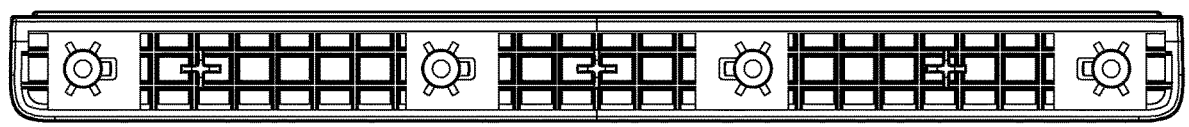
Figure 29:
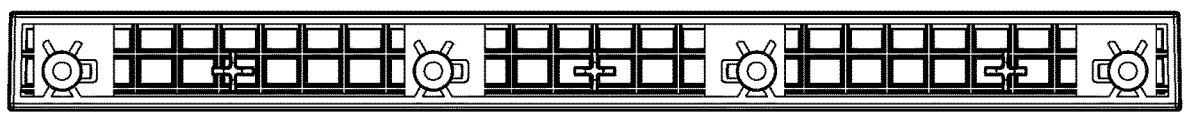
Figure 30:
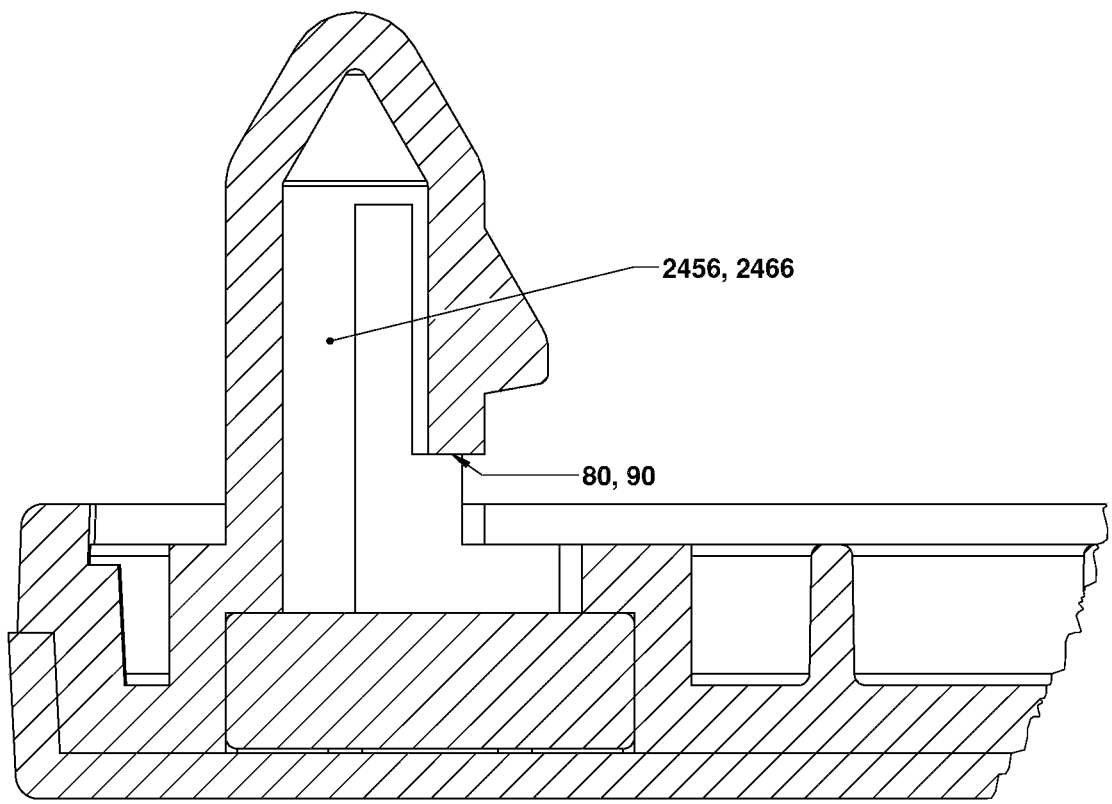

FIG. 23 shows different views of clips 1856, 1866 according to one embodiment. Clips 1856, 1866 may be as described in Termax patents U.S. Pat. Nos. 6,718,599 and 7,188,392 herby incorporated by reference.

FIGS. 24-30 are various view of a dome or cap clip latch assembly according to one embodiment.

The lid magnetic holder 250, 2450 further comprises a lid carrier 2450 comprising a lid prong 2456 extending from the lid carrier 2450, the lid prong 2456 comprising a side wing 2510 to spring outwardly into a lid slot 80. As the lid prong 2456 and bin prong 2466 are inserted into slots 80, 90, the side wing 2510 springs inwardly to permit insertion and after the side wing 2510 clears the slot 80,90 the side wing 2510 swings out to clip the lid prong 2456 and bin prong 2466 into the slot 80,90. The lid carrier 2450 and the lid magnet 252 are overmolded 2454.

The bin magnetic holder 260, 2460 further comprises a bin carrier 2460 comprising a bin prong 2466 extending from the bin carrier 2460, the bin prong 2466 comprising a side wing 2510 to spring outwardly into a bin slot 90. The bin carrier 2460 and the bin magnet 262 are overmolded 2464. Lid prong 2456 and bin prong 2466 may be fasteners as described in Termax patent U.S. Pat. No. 10,995,783 herby incorporated by reference.

According to one embodiment, alignment prong(s) 1770 are inserted into corresponding slots 80, 90 to provide alignment during insertion of the lid magnetic holder 2450 into the lid 20 and of the lid prongs 2456 into lid slot(s) 80. Similarly, alignment prong(s) 1770 are inserted into corresponding slots 80, 90 to provide alignment during insertion of the, the entire bin magnetic holder 2460 may be clipped into the bin 30 by inserting bin prongs 2466 into lid slot(s) 90.

According to an alternative embodiment, the lid 20 may further comprise base holes 80' to accept fastener 700 [spears 1700, clips 1856, 1866, prongs 2456, 2466 on the overmold 250, 260, 1854, 1856, 2464, 2454]. The base holes 80' permit alternative attachment to the body panel by applying glue or any suitable fastener. Tapered holes that have a larger diameter on the top side of the fastener 700 than on the bottom side (mating with the body panel) filled with glue will further provide a mechanical connection as well as the adhesive connection as a result of the adhesive properties of the glue. The latch assembly 40 thus comprises a body panel 10 such as a lid 20 attached to the magnetic overmold 50, 60 attached via fastener 700 to mate with hole 80', or alternatively glue or other suitable fastener such as a screw, bolt, rivet or any suitable fastener.

Alternatively, lid 20 or bin 30 may include any attachment mechanism suitable to couple or attach to a overmolded magnets 50, 60 such as a nut, bolt, weld stud, thread stud, button head, clip, panel clip, retainer, panel mounted receptacle, retainer washer, or rivet, cable tie, wire clip, hook and loop fastener (Velcro®), sticky tape, double faced tape, spike array, or any suitable combination. The corresponding mounting structure thus would attach to the base attachment mechanism with a corresponding attachment mechanism.

The overmolded magnets 50, 60 may be a single piece (i.e. a magnet) or multi-piece device. Although the overmolded magnet 50, 60 is shown as rectangular, any suitable shape may be used including oval, square, round, triangular or polygon. For example, the geometry of magnets 252, 262, number of magnets 252, 262, distance between magnets may be designed for the desired amount of magnetic force.

Unlike conventional latches that have a plastic or metal snap sound that generates mid to high audio frequencies, the magnetic latch 40 has a high quality quiet engagement with no or highly dampened or attenuated mid and high audio frequency sound. The magnetic latch 40 has a totally different feel, look and sound unlike conventional latches.

The overmolded magnet 50, 60 adapts to different surface curvatures and thicknesses. The magnetic latch 40 is operative for blind attachment into a container 10, such as a vehicle chassis i.e. door frame, chassis or roof. An optional stand off provides additional height for suitable applications.

According to this embodiment, there is relatively little or no open area between the opposing overmolded magnets 1150, 1160 although the magnets 252, 262 themselves are spaced apart a predetermined distance. This may be suitable for short height applications where there is little or a relatively short distance between the lid and container, i.e. center console. Thus a magnetic latch assembly 40 may include magnetic fasteners 700 of various heights. For example the overmolded magnets 1150, 1160 of various heights may be used where the distance between the lid 20 and bin 30 varies.

Thus, an operator or driver does not have to push any button or engage a lever or release a latch or compress a spring. The user merely lifts up the lid, resulting in a different tactile feel. For example, the user merely overcomes the magnetic force and the weight of the lid. In other words, the user merely grabs and pulls so that the user experiences a different feel. Since the user does experience when lifting the lid overcoming the magnetic force, the initial lifting force decreases as the magnets separate and thus the force corresponds to a different force profile. For example, the magnetic force is inversely proportional to the distance squared. Thus, the force applied by the user is completely different compared to conventional latches for both opening the lid and closing the lid. A significant advantage of the magnetic latch is the highly improved feel for closing and opening the lid from the bin. Another significant advantage is the completely different closing and light magnetic release and tactile feel to release. According to one embodiment, the retention force approximately 2-3 pounds of force however the force can be designed to be less then 2 pounds or greater than 3 pounds.

The magnetic latch assembly 40 may be pre-assembled by attaching the overmolded magnet 1150, 1160 in preparation for insertion into the vehicle chassis. Similarly, the magnetic latch 40 may be pre-assembled by attaching overmolded magnets 1150, 1160 to a lid 20 or bin 30 as described above, such as a center console 10, to form a body panel assembly (not shown) ready fast and easy installation during final assembly of the vehicle.

The magnetic latch 40 and console assembly 10 is operatively inserted as a single unit and aligns with the structure, such as a vehicle chassis, pillar, roof, instrument panel or frame to form a vehicle with the magnetic clip.

The center console may be constructed from plastic or from any suitable material such as plastic, vinyl, cloth, wood, steel, aluminum, magnesium, carbon fiber or any suitable material.

What is claimed is:

1. A magnetic latch for a lid and bin in a container of a vehicle comprising:
    a lid latch comprising:
        a lid magnetic holder;
        a magnet attached to the lid magnetic holder;
        a lid clip attached to the lid magnetic holder for attachment to the lid;
    a bin latch comprising:
        a bin magnetic holder;
        a magnet attached to the bin magnetic holder; and
        a bin clip attached to the bin magnetic holder for attachment to the bin;
    wherein the lid latch and bin latch comprise vibration dampening material to magnetically open and close the lid and the bin of the container.

2. A magnetic latch of claim 1 wherein the magnet is at least one of: a magnetized iron, steel or metal having a magnetic attraction with the magnet.

3. A magnetic latch of claim 1 wherein:
    the magnet attached to the lid magnetic holder is a lid magnet; and
    the magnet attached to the bin magnetic holder is a bin magnet.

4. A magnetic latch of claim 3 wherein:
    the lid magnetic holder and the lid fastener is a lid overmolded magnet; and
    the bin magnetic holder and the bin fastener is a bin overmolded magnet.

5. The magnetic latch of claim 4 further comprising:
    spears formed on a side of the lid overmolded magnet opposite the lid magnet to attach to a corresponding hole on the lid; and
    spears formed on a side of the bin overmolded magnet opposite the bin magnet to attach to a corresponding hole on the bin.

6. The magnetic latch of claim 4 wherein:
    the overmold comprises of at least one of: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS) and
    the metal comprises at least one of: steel, a steel alloy, iron, and a magnetic material.

7. A magnetic latch of claim 3 wherein:
    the lid magnetic holder further comprises:
        a lid carrier comprising:
            a lid prong extending from the lid carrier, the lid prong comprising a side wing to spring outwardly into a lid slot; and the lid carrier and the lid magnet are overmolded;

the bin magnetic holder further comprises:
a bin carrier comprising:
a bin prong extending from the bin carrier, the bin prong comprising a side wing to spring outwardly into a bin slot; and the bin carrier and the bin magnet are overmolded.

8. A magnetic latch of claim 3 wherein:
the lid magnetic holder further comprises a lid carrier having a lid rib, and the lid carrier and the lid magnet are overmolded;
the bin magnetic holder further comprises a bin carrier having a bin rib, and the bin carrier and the bin magnet are overmolded;
the lid clip is inserted and attached to the lid rib; and
the bin clip is inserted and attached to the bin rib.

9. The magnetic latch of claim 3 wherein the magnetic poles on the lid magnet are aligned with the magnetic poles on the bin magnet.

10. The magnetic latch of claim 3, wherein the magnetic poles on the lid magnet are aligned North to South and the magnetic poles on the bin magnet are aligned South to North.

11. The magnetic latch of claim 3 wherein the lid magnet is attached to the lid magnetic holder, and the bin magnet is attached to the bin magnetic holder via at least one of: glue, heat welding, ultrasonic welding, over-molding, mechanically fastened, metal clip, plastic clip, press fit and spears pressed into corresponding holes on the bin and lid.

12. The magnetic latch of claim 1 wherein the vibration dampening material is rubber.

13. The magnetic latch of claim 1 wherein the container is at least one of: center console, glove box, ash tray, trunk, optical glasses storage, fuse box, sun roof shade or cover.

14. The magnetic latch of claim 1 wherein the lid latch and bin latch maintains a substantially zero gap between the lid and the bin.

15. The magnetic latch of claim 1 wherein the lid latch and bin latch, or wear material is in contact when closed.

16. A magnetic latch for a lid and bin in a vehicle comprising:
at least one lid overmolded magnet connected via a lid clip to the lid;
at least one bin overmolded magnet connected via a bin clip to the bin having a magnetic attraction with the lid overmolded magnet; and
wherein the overmolded magnet comprise vibration dampening material to magnetically open and close the lid and the bin of the container.

17. The magnetic latch of claim 16 wherein at least one of: a layer of lid and rib overmolded material, or a wear material, reduces in thickness over a prescribed period of time to maintain a substantial magnetic force corresponding with magnet aging.

18. The magnetic latch of claim 16 wherein:
the at least one lid overmolded magnet comprises:
a lid carrier;
the lid clip attached to the lid carrier, the lid clip for attachment to a lid slot;
a lid magnet overmolded to the lid carrier;
the at least one bin overmolded magnet comprises:
a bin carrier;
the bin clip attached to the bin carrier, the bin clip for attachment to a bin slot; and
a bin magnet overmolded to the bin carrier.

19. The magnetic latch of claim 18 wherein the lid clip is a metal clip attached to a rib on a side of the lid carrier opposite the lid magnet, and the bin clip is a metal clip attached to a rib on a side of the bin carrier opposite the bin magnet.

20. The magnetic latch of claim 18 wherein:
the lid fastener is a plastic prong extending from the lid carrier on a side opposite the lid magnet,
the plastic lid prong comprising a side wing to spring outwardly into a lid slot;
the lid carrier and the lid magnet are overmolded;
the bin fastener is a plastic prong extending from the bin carrier on a side opposite the lid magnet,
the plastic bin prong comprising a side wing to spring outwardly into a bin slot;
the bin carrier and the bin magnet are overmolded.

21. A magnetic latch and storage assembly for a vehicle comprising:
a bin having a storage cavity configured to attach to a vehicle chassis;
a lid hinged to the bin and configured to open and close;
a magnetic latch attached to the lid and configured to open and close comprising:
at least one lid overmolded magnet connected via a lid clip to the lid;
at least one bin overmolded magnet connected via a bin clip to the bin having a magnetic attraction with the lid overmolded magnet; and
wherein the overmolded magnet comprise vibration dampening material to magnetically open and close the lid and the bin of the container.

22. The magnetic latch assembly of claim 21 wherein:
the at least one lid overmolded magnet comprises:
a lid carrier;
the lid clip attached to the lid carrier, the lid fastener for attachment to a lid slot;
a lid magnet overmolded to the carrier;
the at least one bin overmolded magnet comprises:
a bin carrier;
the bin clip attached to the bin carrier, the bin fastener for attachment to a bin slot; and
a bin magnet overmolded to the carrier.

23. A magnetic latch assembly of claim 21 wherein:
the lid fastener is a plastic prong extending from the lid carrier on a side opposite the lid magnet, the plastic lid prong comprising a side wing to spring outwardly into a lid slot;
the lid carrier and the lid magnet are overmolded;
the bin fastener is a plastic prong extending from the bin carrier on a side opposite the lid magnet, the plastic bin prong comprising a side wing to spring outwardly into a bin slot;
the bin carrier and the bin magnet are overmolded.

24. The magnetic latch of claim 1 wherein the lid magnet and bin magnet attraction does not degrade a tactile feel.

* * * * *